(12) United States Patent
Newton

(10) Patent No.: US 12,720,134 B2
(45) Date of Patent: Aug. 25, 2026

(54) TECHNIQUES FOR SELECTIVELY DELAYING RESPONSES TO PREMATURE REQUESTS FOR ENCODED MEDIA CONTENT

(71) Applicant: NETFLIX, INC., Los Gatos, CA (US)

(72) Inventor: Christopher Alan Newton, North Richland Hills, TX (US)

(73) Assignee: NETFLIX, INC., Los Gatos, CA (US)

( * ) Notice: Subject to any disclaimer, the term of this patent is extended or adjusted under 35 U.S.C. 154(b) by 17 days.

(21) Appl. No.: 18/300,236

(22) Filed: Apr. 13, 2023

(65) Prior Publication Data

US 2024/0348848 A1 Oct. 17, 2024

(51) Int. Cl.
*H04N 21/24* (2011.01)
*H04N 21/2187* (2011.01)
*H04N 21/6377* (2011.01)

(52) U.S. Cl.
CPC ..... *H04N 21/2407* (2013.01); *H04N 21/2187* (2013.01); *H04N 21/6377* (2013.01)

(58) Field of Classification Search
None
See application file for complete search history.

(56) References Cited

U.S. PATENT DOCUMENTS 8,191,097 B1 * 5/2012 Armstrong ....... H04N 21/25891 709/215
2014/0189066 A1 * 7/2014 Gholmieh .......... H04N 21/2407 709/219
2015/0134846 A1 5/2015 Bazar et al.
2017/0104838 A1 * 4/2017 Busayarat .......... H04N 21/4332
2018/0176297 A1 6/2018 DiVincenzo et al.
2018/0183890 A1 * 6/2018 Patil ................... H04N 21/8456
2023/0291944 A1 * 9/2023 Ortega, III ......... H04N 21/6587

OTHER PUBLICATIONS

International Search Report for Application No. PCT/US2024/023728 dated Jul. 11, 2024.

* cited by examiner

*Primary Examiner* — Jason K Lin
(74) *Attorney, Agent, or Firm* — Artegis Law Group, LLP

(57) ABSTRACT

In various embodiments, a segment delivery application streams segments of downloadables to client devices. At a first point-in-time, the segment delivery application receives a request from a server for a segment of a downloadable. The segment delivery application determines that the segment is not available and that the segment is a next expected segment of the downloadable. At a second-point in time, the segment delivery application determines that the segment has become available. Upon determining that the segment has become available, the segment delivery application transmits to the server a response that includes the segment and corresponds to the request.

22 Claims, 4 Drawing Sheets

TECHNIQUES FOR SELECTIVELY DELAYING RESPONSES TO PREMATURE REQUESTS FOR ENCODED MEDIA CONTENT

BACKGROUND

Field of the Various Embodiments

The various embodiments relate generally to computer science and to media streaming technology and, more specifically, to techniques for selectively delaying responses to premature requests for encoded media content.

Description of the Related Art

In some approaches to streaming media content to endpoint devices, a media processing pipeline is used to encode discrete portions of a media source across different sets of encoding parameters to generate segments of different downloadables. Each "downloadable" constitutes a different encoded version of the entire media source. These segments are stored in memory associated with an origin server and subsequently streamed to various client devices, on-demand, via a content delivery network (CDN). In many conventional CDNs, edge servers are implemented at the lowest level of a server hierarchy and typically reside in the same geographical region as the client devices to which content is delivered. Each edge server usually is capable of caching the segments associated with various downloadables and transmitting segments to one or more client devices on behalf of an origin server.

When an edge server receives a request from a client device for a segment that is not stored in the cache memory associated with the edge server, the edge server has to relay the request upstream through the CDN until the request either reaches a server that has the segment stored in cache memory or ultimately reaches the origin server. The response to the request is relayed downstream through the CDN to the edge server, and the edge server transmits the response to the client device. This type of on-demand delivery process works well when streaming pregenerated downloadables for static media sources, such as videos of movies. However, in the context of live events, downloadables are incrementally generated based on live media feeds in real-time. As a result, client devices can have difficulty determining the name of each segment and when to request each segment when streaming live event downloadables.

In one approach to streaming live event downloadables, each live event downloadable is associated with a segment name template, and each client device implements a clock that is synchronized with a clock implemented by the media processing pipeline. The segment name template specifies a start time, a segment duration, and a parameterized segment name that includes a sequence number parameter. The segment name template associated with a live event downloadable enables a client device to compute expected availability times and names of the segments of the live event downloadable. To stream a live event downloadable, the client device repeatedly computes the expected availability time and name of the next segment, and when the clock reaches the expected availability time, the client device transmits a request specifying the name of the next segment to an edge server.

One drawback of the above approach is that, because the actual availability times can deviate from the expected availability times, a client device can end up requesting segments of a downloadable that have not yet been generated and/or stored in the origin server. When a client device prematurely requests a segment in this fashion, the request oftentimes is relayed upstream through the entire CDN to the origin server. The origin server then responds that the segment cannot be found, and the response is relayed downstream, back through the entire CDN, to the client device. Upon receiving the response indicating that the segment cannot be found, the client device usually re-requests the segment within a few milliseconds in an attempt to reduce the time between when some aspect of the live event occurs and when the client device displays the media content corresponding to that aspect of the live event. This process can repeat multiple times, where the client device re-requests the segment, before the segment actually becomes available and can be transmitted to the client device. This repeated process of requesting and requesting segments prematurely can end up unnecessarily wasting substantial amounts of time and network and processing resources.

As the foregoing illustrates, what is needed in the art are more effective techniques for streaming segments of live event downloadables.

SUMMARY

One embodiment sets forth a computer-implemented method for streaming segments of downloadables to client devices. The method includes at a first point-in-time, receiving a first request from a first server for a first segment of a first downloadable; determining that the first segment is not available; determining that the first segment comprises a next expected segment of the first downloadable; at a second point-in-time, determining that the first segment has become available; and upon determining that the first segment has become available, transmitting to the first server a first response that includes the first segment and corresponds to the first request.

At least one technical advantage of the disclosed techniques relative to the prior art is that, with the disclosed techniques, an origin server can delay responding to a premature request for a segment of a downloadable until that segment is actually available. In that regard, the disclosed techniques enable the origin server to determine whether a requested segment is the next expected segment of a downloadable based on a parameterized segment name for the downloadable and the most recent segment stored in a memory associated with the origin server. Notably, with the disclosed techniques, a client device can preemptively transmit a request to an edge server for a segment of a downloadable and, after the segment becomes available to the origin server, receive from the edge server a response that includes the segment. Because the disclosed techniques enable a client device to receive a segment of a downloadable that is prematurely requested without having to re-request the segment, the amount of network and processing resources used to stream live events can be reduced relative to what is required using prior art techniques. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details. For explanatory purposes, multiple instances of like objects are symbolized with reference numbers identifying the object and parenthetical numbers(s) identifying the instance where needed.

System Overview

Figure 1:
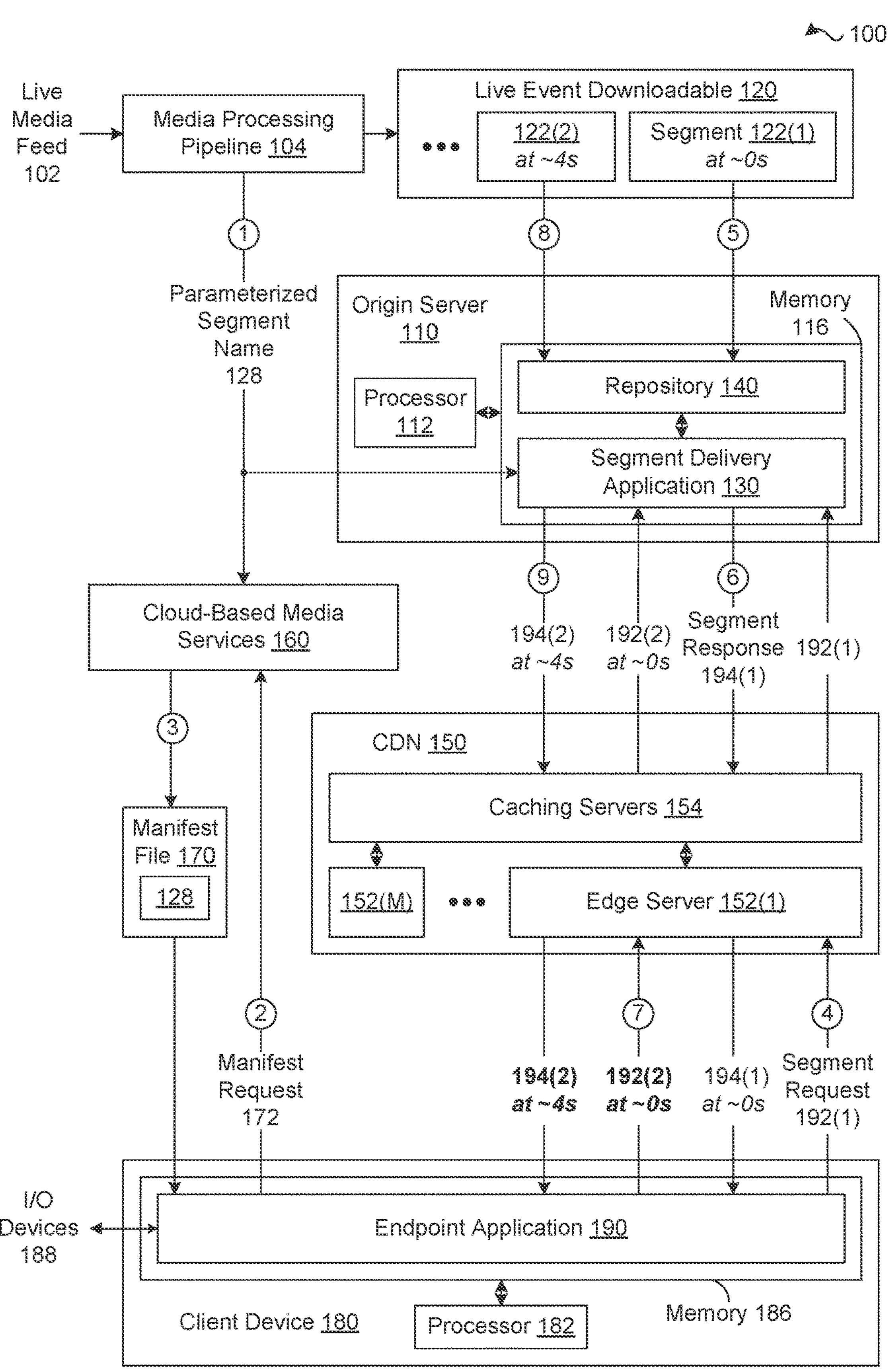
FIG. 1 is a conceptual illustration of a system configured to implement one or more aspects of the various embodiments.

FIG. 1 is a conceptual illustration of a system 100 configured to implement one or more aspects of the various embodiments. As shown, in some embodiments, the system 100 includes, without limitation, an origin server 110, a media processing pipeline 104, a CDN 150, cloud-based media services 160, and a client device 180.

In some other embodiments, the system 100 can omit the media processing pipeline 104, the cloud-based media services 160, or both. In the same or other embodiments, the system 100 can further include, without limitation, one or more other origin servers, one or more other media processing pipelines, one or more other CDNs, one or more other client devices, or any combination thereof.

Any number of the components of the system 100 can be distributed across multiple geographic locations or implemented in one or more cloud computing environments (e.g., encapsulated shared resources, software, data) in any combination. In some embodiments, the media processing pipeline 104, the origin server 110, or both can be implemented in a cloud computing environment, implemented as part of any other distributed computing environment, or implemented in a stand-alone fashion.

As shown, the origin server 110 includes, without limitation, a processor 112 and a memory 116. In some embodiments, the origin server 110 is a compute instance, and each of the origin server 110 and any number of other compute instances (not shown) can include any number of other processors and any number of other memories in any combination. In particular, the origin server 110 and/or one or more other compute instances can provide a multiprocessing environment in any technically feasible fashion.

The processor 112 can be any instruction execution system, apparatus, or device capable of executing instructions. For example, the processor 112 could comprise a central processing unit, a graphics processing unit, a controller, a microcontroller, a state machine, or any combination thereof. The memory 116 stores content, such as software applications and data, for use by the processor 112.

The memory 116 can be one or more of a readily available memory, such as random-access memory, read only memory, floppy disk, hard disk, or any other form of digital storage, local or remote. In some embodiments, a storage (not shown) may supplement or replace the memory 116. The storage may include any number and type of external memories that are accessible to the processor 112 of the origin server 110. For example, and without limitation, the storage can include a Secure Digital Card, an external Flash memory, a portable compact disc read-only memory, an optical storage device, a magnetic storage device, or any suitable combination of the foregoing.

In particular, the origin server 110 and zero or more other origin servers collectively store at least one copy of each of any number of downloadables for streaming to the client device 180 and any number of other client devices via the CDN 150. As referred to herein, a "downloadable" is an encoded version of any type of media content. Some examples of different types of media content are video, audio, and subtitles. The media content can be delivered in real-time via a live media feed associated with any number and/or types of live events, can be stored in source files associated with any number and/or types of media titles, or can be acquired dynamically and/or statically in any other technically feasible fashion.

Downloadables associated with live events are also referred to herein as "live event downloadables." Some examples of live events are a live sporting event, a live television show, a live performance, a live speech, and a live meeting. Each live event can be associated with any number of different live media feeds, where each live media feed is associated with a different source (e.g., a different camera). Downloadables derived from source files are also referred to herein as "video on demand" or "VOD" downloadables. Some examples of media titles are feature-length films, episodes of prerecorded television programs, music videos, and podcasts, to name a few. Live event downloadables are incrementally generated based on live media feeds in real-time, while downloadables derived from source files are typically pregenerated. Other types of downloadables can be generated dynamically and/or statically in any technically feasible fashion.

For explanatory purposes, the functionality of the media processing pipeline 104, the origin server 110, the CDN 150, the cloud-based media services 160, and the client device 180 are described below in the context of streaming live event downloadables. Note, however, that the techniques described herein are illustrative rather than restrictive. Many modifications and variations will be apparent to those of ordinary skill in the art without departing from the scope and spirit of the described embodiments and techniques.

In particular, the techniques described herein in the context of live event downloadables can be applied to any type of downloadable that is at least partially generated in an incremental fashion. For instance, in some embodiments, the techniques described herein can be modified to implement a creation "cycle" process in which client devices can preemptively request a next object in a time series data set that is generated or pulled from a database in any technically feasible fashion. In the same or other embodiments, the origin server 110 can determine whether a request for a missing object is a request for a next expected object and whether and/or how long to hold open an associated connection based on any identifier associated with the next expected object.

The media processing pipeline 104 generates any number and/or types of live event downloadables based on any number and/or types of live media feeds. More specifically, the media processing pipeline 104 encodes each live media feed across one or more sets of encoding parameters to incrementally generate one or more live event downloadables having different characteristics. For instance, in some embodiments, the media processing pipeline 104 encodes a live video feed across multiple sets of encoding parameters to generate live event downloadables having different combinations of resolutions and bitrates.

Each live event downloadable includes, without limitation, a sequence of one or more discrete, time-based segments that correspond (in a playback timeline) to a sequence of one or more discrete source segments of the associated live media feed. Accordingly, a different portion of a live video feed, a live audio feed, a live subtitle feed, or any type of other media feed is encoded to generate each segment of a live event downloadable. For explanatory purposes, a "segment" as used herein refers to a segment of a downloadable.

In some embodiments, the media processing pipeline 104 independently encodes each portion of a live media feed to ensure that each corresponding segment can be decoded independently of any other segments. Ensuring that each segment can be independently decoded enables endpoint applications to switch between downloadables generated based on the same live media feed at segment boundaries during playback.

As new segments of live event downloadables are generated, the segments are stored in the repository 140. The repository 140 is also referred to herein as a "memory associated with the origin server 110" and can include any number of portions (including all) of any number and/or types of memories (e.g., internal memories, storage) associated with the origin server 110. As shown, in some embodiments, the repository 140 is included in the memory 116 of the origin server 110 and therefore is at least a portion of at least one memory that is included in the memory 116. In some other embodiments, the repository 140 can be at least a portion of at least one memory that is included in the memory 116, any number and/or types of other internal memories that are available to the origin server 110, any number and/or types of external memories (e.g., storage) that are available to the origin server 110, or any combination thereof.

A segment can be stored in the repository 140 in any technically feasible fashion. In some embodiments, the media processing pipeline 104 writes segments directly to the repository 140. In some other embodiments, the media processing pipeline 104 transmits segments to the origin server 110 for storage in the repository 140 via any number and/or types of transfer mechanisms and/or as per any number and/or types of transfer protocols. For instance, in some embodiments, the media processing pipeline 104 uses Hypertext Transfer Protocol (HTTP) chunked transfer encoding or any other type of progressive streaming data transfer mechanism to transmit segments of live event downloadables to the origin server 110. In some other embodiments, the media processing pipeline 104 fully generates a segment and then uses an HTTP PUT command to transfer the segment to the origin server 110.

For each downloadable, the media processing pipeline 104 generates a parameterized segment name and optionally any amount and/or types of other metadata that describes any number of aspects of the downloadable and/or the segments included in the downloadable. The parameterized segment name can encapsulate a naming convention for the segments of the downloadable based on one or more parameters in any technically feasible fashion.

In some embodiments, the parameterized segment name includes, without limitation, a sequence number parameter that is replaced with a value for the sequence number parameter to generate a name of a corresponding segment. A value for the sequence number parameter is also referred to herein as a "sequence number." In some embodiments, the sequence number of one corresponds to the first segment in a downloadable, the sequence number of two corresponds to the second segment in a downloadable, and so forth.

As used herein, a name of a segment refers to any type of identifier for the segment. For instance, a name of a segment can be any portion (including all) of a Universal Resource Locator (URL). As described in greater detail below, the media processing pipeline 104 transmits the segment name template for each downloadable to the cloud-based media services 160 to enable client devices to determine names of segments irrespective of whether the segments have actually been generated.

The CDN 150 delivers segments on behalf of the origin server 110 to the client device 180 and any number of other client devices. As shown, the CDN 150 includes, without limitation, an edge server 152(1)—an edge server 152(M) and caching servers 154, where M can be any positive integer. Each of the edge server 152(1)—the edge server 152(M) and the caching servers 154 is a proxy server that is capable of selectively caching segments. The edge server 152(1)—the edge server 152(M) are implemented at the lowest level of a server hierarchy and the caching servers 154 are implemented at higher levels of the server hierarchy. For explanatory purposes, the edge server 152(1)—the edge server 152(M) are also referred to herein individually as an "edge server 152" and collectively as "edge servers 152."

The edge servers 152 receive requests from and transmit responses to the client device 180 and any number of other client devices on behalf of the origin server 110. A subset of the caching servers 154 that are implemented at the highest level of the server hierarchy transmit requests to and receive response from the origin server 110 on behalf of the client device 180 and any number of other client devices.

The cloud-based media services 160 includes, without limitation, microservices, databases, and storage for activities and content associated with the streaming media service that are allocated to none of the media processing pipeline 104, the origin server 110, the CDN 150, or the client devices. Some examples of functionality that the cloud-based media services 160 can provide include, without limitation, login and billing, personalized live event and media title recommendations, video transcoding, server and connection health monitoring, and client-specific CDN guidance.

As shown, the client device 180 includes, without limitation, a processor 182 and a memory 186. In some embodiments, the client device 180 is a compute instance, and the client device 180 and any number of other compute instances (not shown) can include any number of other processors and any number of other memories in any combination. In particular, the client device 180 and/or one or more other compute instances can provide a multiprocessing environment in any technically feasible fashion.

The processor 182 can be any instruction execution system, apparatus, or device capable of executing instructions. For example, the processor 182 could comprise a central processing unit, a graphics processing unit, a controller, a microcontroller, a state machine, or any combination thereof. The memory 186 stores content, such as software applications and data, for use by the processor 182.

The memory 186 can be one or more of a readily available memory, such as random-access memory, read only memory, floppy disk, hard disk, or any other form of digital storage, local or remote. In some embodiments, a storage (not shown) may supplement or replace the memory 186. The storage may include any number and type of external memories that are accessible to the processor 182 of the client device 180.

As shown, in some embodiments, the client device 180 is connected to input/output (I/O) devices 188. The I/O devices 188 includes, without limitation, any number of input devices, any number of output devices, any number of I/O devices, or any combination thereof. For example, the I/O devices 188 can include, without limitation, a display device, a touchscreen device, a speaker, a microphone, a mouse, a keyboard, or any combination thereof.

The client device can display any amount and/or types of visual content and/or audio content via one or more of the I/O devices 188 in any technically feasible fashion. The client device 180 can receive input from one or more associated user(s) via one or more of the I/O devices 188 in any technically feasible fashion. In some embodiments, the client device 180 can be integrated with any number and/or types of other devices (e.g., one or more other compute instances and/or a display device) into a user device. Some examples of user devices include, without limitation, desktop computers, laptops, smartphones, tablets, and set-top boxes.

In general, each of the origin server 110, the client device 180, and any number and/or types of other compute instances is configured to implement one or more software applications. For explanatory purposes, each software application is described as residing in the memory of a single compute instance and executing on the processor of the same compute instance. However, in some embodiments, the functionality of each software application can be distributed across any number of other software applications that reside in the memories of any number of compute instances and execute on the processors of any number of compute instances in any combination. Further, the functionality of any number of software applications can be consolidated into a single software application.

As shown, a segment delivery application 130 resides in the memory 116 of the origin server 110 and executes on the processor 112 of the origin server 110. The segment delivery application 130 provides segments of downloadables on-demand to the CDN 150. The CDN 150 relays requests for segments from the client device 180 and any number of other client devices to the origin server 110 and relays corresponding responses from the origin server 110 to the client device 180 and any number of other client devices.

As shown, an instance of an endpoint application 190 resides in the memory 186 of the client device 180 and executes on the processor 182 of the client device 180 to stream downloadables for playback on one or more of the I/O devices 188. More generally, for each of any number of client devices, a different instance of the endpoint application 190 resides in the memory of the client device and executes on the processor of the client device to stream downloadables for playback on one or more I/O devices associated with the client device.

To stream a live event to a client device, the endpoint application 190 transmits to the cloud-based media services 160 a request for a manifest file for the live event. In response, the cloud-based media services 160 generates a manifest file that enables the endpoint application 190 to stream one or more live event downloadables associated with the live event. In particular, the manifest file describes one or more live event downloadables that are generated in real-time during the live event and includes the associated parameterized segment name(s).

As described previously herein, because live event downloadables are incrementally generated based on live media feeds in real-time, determining the name of each segment and when to request each segment when streaming segments of live event downloadables can be problematic. In one conventional approach to streaming segments of live event downloadables, each segment of each live event downloadable associated with a given live event has the same duration (e.g., four seconds) that is referred to herein as a "segment duration." For each downloadable, the segment duration, a start time, and a parameterized segment name are specified in an associated conventional segment name template.

A conventional endpoint application executing on a client device implements a clock that is synchronized with a clock implemented by a conventional media processing pipeline. To stream a live event downloadable, the conventional endpoint application repeatedly computes the expected availability time and name of the next segment, and when the clock reaches the expected availability time, the conventional endpoint application transmits a request specifying the name of the next segment to an edge server.

One drawback of the above approach is that, because the actual availability times can deviate from the expected availability times, a client device can end up requesting segments of a downloadable that have not yet been generated and/or stored in the origin server. When a client device prematurely requests a segment in this fashion, oftentimes the request is relayed upstream through the CDN to the origin server. In response, a conventional segment delivery application executing on the origin server responds that the segment cannot be found, and the response is relayed downstream through the CDN to the client device. This request/response process is often repeated every few milliseconds until the segment actually becomes available and can be transmitted to the client device. This repeated process of requesting and requesting segments prematurely can end up unnecessarily wasting substantial amounts of time and network and processing resources. Another drawback of the above approach is that in order to reduce the likelihood of prematurely requesting segments of a live event downloadable, some client devices intentionally delay requesting each segment by a few seconds from the expected availability time. As a result, the overall latency of the live streaming experience is increased.

Selectively Holding Open Premature Requests for Segments of Live Event Downloadables To address the above problems, the origin server 110 includes, without limitation, a segment delivery application 130 that holds open requests for next expected segments of live event downloadables until the next expected segments are available to the origin server 110. Because the segment delivery application 130 can hold open requests for next expected segments, client devices can receive next expected segments of live event downloadables that are prematurely requested without having to re-request the next expected segments.

Prior to a live event, the media processing pipeline 104 generates a different parameterized segment name for each of one or more downloadables associated with the live event. To enable the segment delivery application 130 to identify requests for next expected segments of the downloadables, the media processing pipeline 104 transmits the associated parameterized segment names directly to the segment delivery application 130 and indirectly to any number of client devices via the cloud-based media services 160.

During the live event, the media processing pipeline 104 generates segments of the one or more downloadables associated with the live event based on discrete portions of associated live media feed(s). Notably, the media processing pipeline 104 names the segments of each downloadable in accordance with the parameterized segment name associated with the downloadable. As described previously herein, as the media processing pipeline 104 generates segments, the segments are stored in the repository 140.

As shown, the segment delivery application 130 responds to requests for segments of live event downloadables, where each request is transmitted by a client device and relayed through at least a portion of the CDN 150 to a requesting server. The requesting server can be any one of the caching servers 154 that is at a highest level of a server hierarchy. Each request for a segment of a live event downloadable specifies a name of the segment, where the name of the segment is consistent with the parameterized segment name associated with the live event downloadable.

In some alternate embodiments, one or more endpoint applications executing on one or more client devices can directly transmit requests for segments of live event downloadables to the segment delivery application 130 executing on the origin server 110. The segment delivery application 130 can directly transmit responses to requests for live event downloadables to the requesting endpoint application(s). In the same or other alternate embodiments, the CDN 150 can be omitted from the system 100. The techniques described herein are modified accordingly.

Upon receiving a request for a segment of a live event downloadable, the segment delivery application 130 determines whether the segment is available. The segment delivery application 130 can determine whether the segment is available in any technically feasible fashion. For instance, in some embodiments, the segment delivery application 130 attempts to access the segment from the repository 140. If the segment delivery application 130 successfully accesses the segment then the segment delivery application 130 determines that the segment is available. Otherwise, the segment delivery application 130 determines that the segment is not available.

If the segment delivery application 130 determines that the segment is available, then the segment delivery application 130 transmits to the requesting server a response that includes the segment and corresponds to the request. The response is subsequently relayed through at least a portion of the CDN 150 to the client device that transmitted the corresponding request.

If, however, the segment delivery application 130 determines that the segment is not available, then the segment delivery application 130 determines whether the segment is a next expected segment of the live event downloadable. To determine whether the segment is the next expected segment of the live event downloadable, the segment delivery application 130 compares the name of the segment that is specified in the request to a name of the next expected segment.

The segment delivery application 130 computes the name of the next expected segment based on the parameterized segment name associated with the live event downloadable and a next sequence number. The segment delivery application 130 increments a sequence number associated with a most recent segment of the live event downloadable that is stored in the repository 140 to compute the next sequence number.

If the name of the segment that is specified in the request does not match the name of the next expected segment, then the segment delivery application 130 determines that the segment is not the next expected segment of the live event downloadable. Because the segment is not the next expected segment of the live event downloadable, the segment delivery application 130 does not hold open the request. Instead, the segment delivery application 130 transmits to the requesting server a response indicating that the segment was not found (e.g., an HTTP response specifying an HTTP 404 status code error).

If, however, the name of the segment that is specified in the request matches the name of the next expected segment, then the segment delivery application 130 determines that the segment is the next expected segment of the live event downloadable. Because the segment is the next expected segment of the live event downloadable, the segment delivery application 130 holds open the request and leaves the associated connections to the requesting servers open.

While the segment delivery application 130 holds open the request, the segment delivery application 130 can receive any number of other requests for the same segment and/or any number of other requests for other segments. The segment delivery application 130 also holds open any other requests for the same segment and leaves the associated connections to the requesting servers open. As persons skilled in the art will recognize, each request for the same segment is received from a different one of the caching servers 154 that is at a highest level of a server hierarchy.

The segment delivery application 130 concurrently processes any other requests for other segments using any number of the techniques described herein in the context of processing the segment. Accordingly, while the segment delivery application 130 holds open the request, the segment delivery application 130 can hold open any number of other requests and the associated connections, transmit to any number of requesting servers any number of other responses that include other segments, transmit to any number of requesting servers any number of other responses indicating that different segments were not found, or any combination thereof.

The segment delivery application 130 can track requests that are held open or "pending requests" and the associated segments in any technically feasible fashion. As described in greater detail below in conjunction with FIG. 2, in some embodiments, the segment delivery application 130 tracks requests that are held open and the associated segments via a list of pending requests or "pending request list" (not shown in FIG. 1).

In particular, in response to determining that the segment is the next expected segment, the segment delivery application 130 adds the request to the list of pending requests, where one or more of the pending requests are serviced once the segment becomes available. The segment delivery application 130 can determine that a segment associated with one or more pending requests has become available in any technically feasible fashion.

In some embodiments, the segment delivery application 130 determines that a segment associated with one or more pending requests has become available upon detecting that at least a portion of the segment has been received by the origin server 110. More specifically, in some embodiments, the media processing pipeline 104 implements a progressive streaming data transfer mechanism to transmit the segment to the origin server 110, and the segment delivery application 130 determines that the segment has become available when the segment begins to arrive at the origin server 110. In some other embodiments, the segment delivery application 130 determines that the segment has been available when the entire segment has arrived at the origin server 110.

In some other embodiments, the segment delivery application 130 determines that a segment associated with one or more pending requests has become available upon detecting that at least a portion of the segment has been stored in the repository 140. More specifically, in some embodiments, the media processing pipeline 104 implements a progressive streaming data transfer mechanism to store the segment in the repository 140, and the origin server 110 determines that the segment has become available when the segment begins to be stored in the repository 140. In some other embodiments, the segment delivery application 130 determines that the segment has become available when the entire segment has been stored in the repository 140.

Upon determining that a segment associated with one or more pending requests has become available, the segment delivery application 130 removes each pending request for the segment from the list of pending requests and services each pending request for the segment. More specifically for each pending request for the segment, the segment delivery application 130 transmits to the associated requesting server a response that includes the segment and corresponds to the pending request.

Advantageously, because the segment delivery application 130 can hold open requests for next expected segments, client devices can preemptively request and successfully receive next expected segments of live event downloadables without issuing re-requests that unnecessarily waste time and network and processing resources. Notably, each client device can automatically begin to receive each segment when the segment becomes available at the origin server 110. As a result, preemptive requests can reduce end-to-end latency without requiring resource-wasting polling operations. Furthermore, none of the client devices nor the endpoint application 190 need to implement clocks that are synchronized to the media processing pipeline 104 to determine when to request segments of live event downloadables.

And because the endpoint application 190 does not compute expected availability times of segments of a downloadable based on a uniform segment duration, the media processing pipeline 104 can vary the duration of the portions of a live media feed that are encoded to generate segments of live event downloadables. Consequently, the duration of the segments within each live event downloadable can vary. However, to facilitate adaptive streaming, when multiple live event downloadables are generated based on the same live media feed, the segments of the live event downloadables corresponding to the same sequence number are derived from the same portion of the live media feed and therefore have the same duration.

As persons skilled in the art will recognize, if the duration of segments varies across a live event downloadable, then the endpoint application 190 can determine the time corresponding to the start of each segment to facilitate scrubbing functionality, such as rewind, pause, and fast forward, during the live event in any technically feasible fashion. For instance, in some embodiments, the endpoint application 190 can request and receive from the cloud-based media services 160 an event manifest that indicates the time corresponding to the start of each segment to facilitate scrubbing functionality.

To stream a live event to a client device, an instance of the endpoint application 190 executing on the client device transmits a request to the cloud-based media services 160 for a manifest file associated with the live event prior to the live event. In response, the cloud-based media services 160 generates a manifest file that describes one or more downloadables associated with the live event and includes the associated parameterized segment name(s).

For each of one or more of the downloadables, the endpoint application 190 determines a name of the first segment of the downloadable based on the associated parameterized segment name and transmits to one of the edge servers 152 a request for the first segment, where the request specifies the name of the first segment. Repeatedly during the live event, upon receiving from one of the edge servers 152 a response that includes a requested segment of a downloadable, the client device preemptively generates a new request for the next expected segment of the downloadable based on the associated parameterized segment name and transmits the request to one of the edge servers 152.

In some other embodiments, the endpoint application 190 can generate new requests of next expected segments of downloadables based on any number and/or types of triggers. For instance, in some embodiments, the origin server 110 implements a progressive streaming data transfer mechanism to transmit segments to client devices via the CDN 150, and the endpoint application 190 generates a new request for a next expected segment of a downloadable when the segment begins to arrive at a client device.

In some embodiments, the media processing pipeline 104 generates conventional segment name templates as described previously herein, and one or more instances of a conventional endpoint application can execute on one or more of the client devices instead of the endpoint application 190. At intervals that are approximately equal to the segment duration of a live event downloadable, the conventional endpoint application requests a new segment of the live event downloadable. If the request is premature, then the origin server 110 holds the request open until the new segment is available and then transmits a response that specifies the new segment and corresponds to the premature request.

For explanatory purposes, FIG. 1 depicts a sequence of events associated with streaming the first two segments of a live event downloadable 120 to the client device 180 via circles numbered from 1 through 9. The circles numbered 1 through 4 occur prior to the start of an associated live event. As depicted via the circle numbered 1, the media processing pipeline 104 transmits to the origin server 110 and the cloud-based media services 160 a parameterized segment name 128 associated with the live event downloadable 120. As depicted via the circle numbered 2, the endpoint application 190 transmits to the cloud-based media services 160 a manifest request 172 for the associated live event.

In response, the cloud-based media services 160 generates a manifest file 170 that describes at least the live event downloadable 120 and includes at least the parameterized segment name 128. As depicted via the circle numbered 3, the cloud-based media services 160 transmits to the endpoint application 190 the manifest file 170. The endpoint application 190 computes a name of a segment 122(1) that is to be the first segment of the live event downloadable 120 based on the parameterized segment name 128 and a value of 1 for a sequence number parameter. In some alternate embodiments, the endpoint application 190 can determine the name of the segment 122(1) in any technically feasible fashion (e.g., from a service endpoint provided by the origin server 110).

As depicted via the circle numbered 4, the endpoint application 190 preemptively transmits to the edge server 152(1) a segment request 192(1). The segment request 192(1) specifies the name of the segment 122(1) of the live event downloadable 120. As shown, the segment request 192(1) is relayed upstream within the CDN 150 via one or more of the caching servers 154 to the segment delivery application 130. Because the segment 122(1) is not available, the segment delivery application 130 holds open the segment request 192(1) and the associated connection.

As shown, the media processing pipeline 104 encodes a first portion of a live media feed 102 to generate the segment 122(1) and then stores the segment 122(1) in the repository 140 (depicted via the circle numbered 5). Upon detecting that the segment 122(1) has been stored in the repository 140, and as depicted via the circle numbered 6, the segment delivery application 130 transmits a segment response 194(1) over the connection associated with the segment request 192(1). The segment response 194(1) includes the segment 122(1) and corresponds to the segment request 192(1). As shown, the segment response 194(1) is relayed downstream within the CDN 150 via zero or more of the caching servers 154 and the edge server 152(1) to the endpoint application 190.

For explanatory purposes, the approximate time at which the endpoint application 190 receives the segment response 194(1) is denoted as approximately 0 seconds (~0 s). Upon receiving the segment response 194(1), the endpoint application 190 computes a name of a segment 122(2) that is to be the second segment of the live event downloadable 120 based on the parameterized segment name 128 and a value of 2 for the sequence number parameter.

As depicted via the circle numbered 7 and still at the approximate time of 0 seconds, the endpoint application 190 preemptively transmits to the edge server 152(1) a segment request 192(2). The segment request 192(2) specifies the name of the segment 122(2) of the live event downloadable 120. As shown, the segment request 192(2) is relayed upstream within the CDN 150 via one or more of the caching servers 154 to the segment delivery application 130. Because the segment 122(2) is not available when the segment delivery application 130 receives the segment request 192(2) at approximately 0 seconds, the segment delivery application 130 holds open the segment request 192(2) and the associated connection.

As shown, the media processing pipeline 104 encodes a second portion of the live media feed 102 to generate the segment 122(2) and then stores the segment 122(2) in the repository 140 (depicted via the circle numbered 8) at approximately 4 seconds (~4 s). Upon detecting that the segment 122(2) has been stored in the repository 140, and as depicted via the circle numbered 9, the segment delivery application 130 transmits a segment response 194(2) over the connection associated with the segment request 192(2). The segment response 194(2) includes the segment 122(2) and corresponds to the segment request 192(2). As shown, the segment response 194(2) is relayed downstream within the CDN 150 via zero or more of the caching servers 154 and the edge server 152(1) to the endpoint application 190. As shown, the time at which the endpoint application 190 receives the segment response 194(2) is approximately 4 seconds (~4 s).

It will be appreciated that the system 100 shown herein is illustrative and that variations and modifications are possible. For example, the functionality provided by the media processing pipeline 104 and the cloud-based media services 160 as described herein can be integrated into or distributed across any number of software applications (including one), and any number of components of the system 100. Further, the connection topology between the various units in FIG. 1 can be modified as desired.

Please note that the techniques described herein are illustrative rather than restrictive and can be altered without departing from the broader spirit and scope of the embodiments. Many modifications and variations on the functionality of the media processing pipeline 104, the cloud-based media services 160, the origin server 110, the segment delivery application 130, the CDN 150, the edge servers 152, the caching servers 154, the client device 180, the I/O devices 188, and the endpoint application 190 will be apparent to those of ordinary skill in the art without departing from the scope and spirit of the described embodiments.

Similarly, the storage, organization, amount, and/or types of data described herein are illustrative rather than restrictive and can be altered without departing from the broader spirit and scope of the embodiments. In that regard, many modifications and variations on the live media feed 102, the live event downloadable 120, the parameterized segment name 128, the manifest file 170, requests for segments, and responses to requests for segments as described herein will be apparent to those of ordinary skill in the art without departing from the scope and spirit of the described embodiments.

Responding to Premature Requests for Segments of Live Event Downloadables

Figure 2:
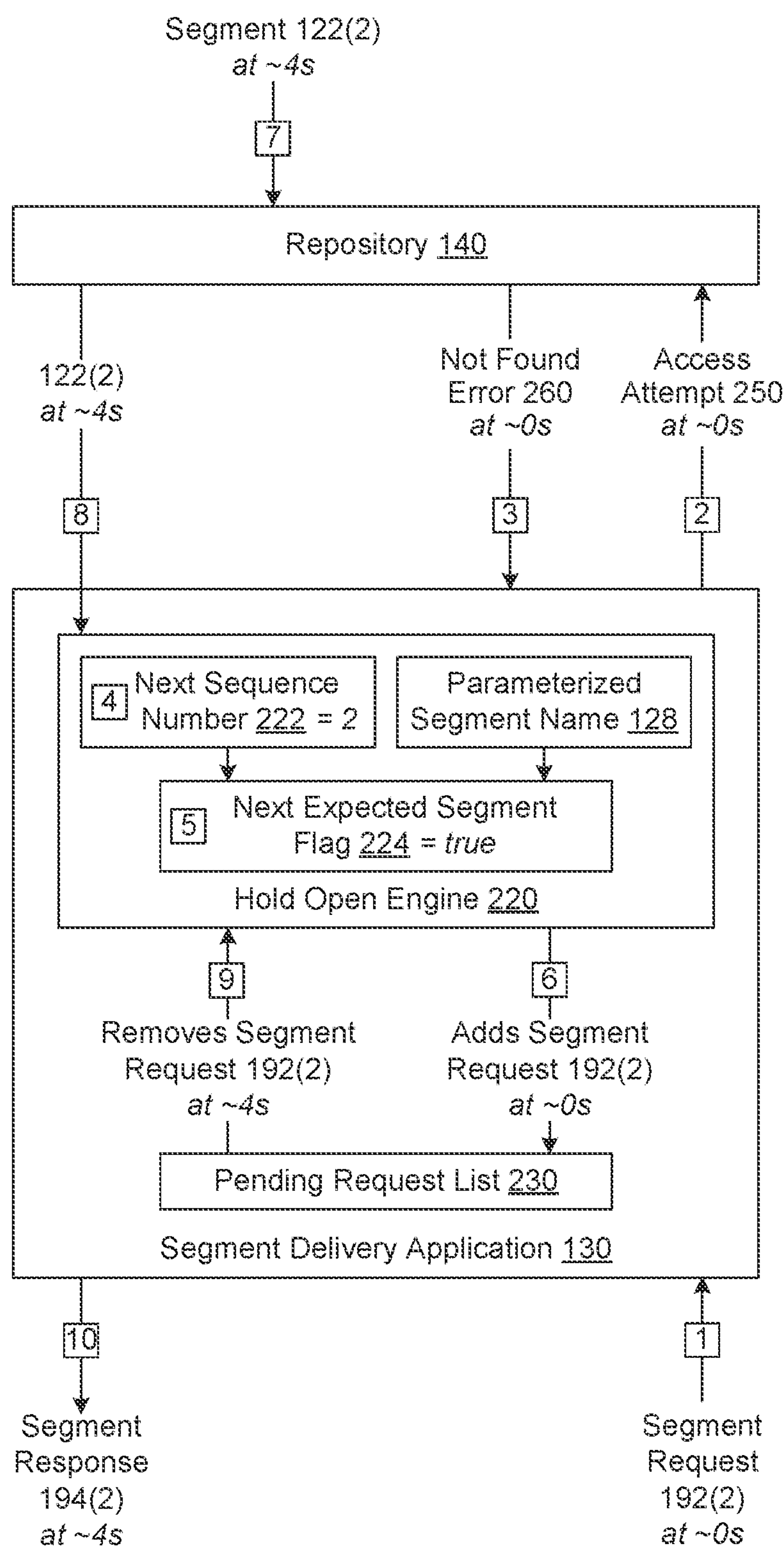
FIG. 2 is a more detailed illustration of the segment delivery application of FIG. 1, according to various embodiments.

FIG. 2 is a more detailed illustration of the segment delivery application 130 of FIG. 1, according to various embodiments. As shown, the segment delivery application 130 includes, without limitation, a hold open engine 220 and a pending request list 230. Upon receiving from a server a request for a segment of a live event downloadable, the segment delivery application 130 determines whether the segment is stored in the repository 140. If the segment is stored in the repository 140, then the segment delivery application 130 transmits to the server a response that includes the segment and corresponds to the request. Otherwise, the hold open engine 220 responds to the request.

For explanatory purposes, the segment delivery application 130, the hold open engine 220, and the pending request list 230 are depicted in and described in conjunction with FIG. 2 in the context of responding to the segment request 192(2) of FIG. 1. As described previously herein in FIG. 1, the segment request 192(2) is a premature request for the segment 122(2) of the live event downloadable 120.

Please note that the techniques described herein are illustrative rather than restrictive and can be altered without departing from the broader spirit and scope of the embodiments. Many modifications and variations on the functionality of the segment delivery application 130, the hold open engine 220, and the pending request list 230 as described herein will be apparent to those of ordinary skill in the art without departing from the scope and spirit of the described embodiments.

As shown, the hold open engine 220 includes, without limitation, the parameterized segment name 128, a next sequence number 222, and a next expected segment flag 224 that are associated with the live event downloadable 120. Although not shown, for each of any number of other live event downloadables, the hold open engine 220 includes a different parameterized name. And at any given point-in-time, the hold open engine 220 includes a different next sequence number and a different next expected segment flag for each live event downloadable that is associated with one or more pending requests.

For explanatory purposes, FIG. 2 depicts a sequence of events associated with receiving and responding to the segment request 192(2) via squares numbered 1 through 10. As depicted with the square numbered 1, the segment delivery application 130 receives from a caching server included in the CDN 150 the segment request 192(2) at a point-in-time that is designated as approximately 0 seconds. As described previously herein in conjunction with FIG. 1, the segment request 192(2) specifies the name of the segment 122(2) of the live event downloadable 120.

As depicted with the square numbered 2, the segment delivery application 130 makes an access attempt 250 at approximately 0 seconds. The access attempt 250 is an attempt to access the segment 122(2) from the repository 140. As depicted with the square numbered 3, the segment delivery application 130 receives a not found error 260 at approximately 0 seconds and in response to the access attempt 250. The segment delivery application 130 determines that the segment 122(2) is not available based on the not found error 260.

Because the segment request 192(2) is a request for an unavailable segment of a live event downloadable, the hold open engine 220 responds to the segment request 192(2). As depicted with the square numbered 4, the hold open engine 220 determines the next sequence number 222 for the live event downloadable 120. More specifically, the hold open engine 220 increments a current sequence number of the most recent segment of the live event downloadable 120 that is stored in the repository 140 at the current point-in-time corresponding to approximately 0 seconds. Referring back to FIG. 1, at approximately 0 seconds, the segment 122(1) is the most recent segment of the live event downloadable 120 that is stored in the repository 140. The hold open engine 220 therefore sets the next sequence number 222 equal to 2.

In some other embodiments, the parameterized segment name 128 can specify a sequence of segment names corresponding to a sequence of segments of the live event downloadable 120 based on any number and/or types of parameters in any technically feasible fashion. The techniques used by the hold open engine 220 and the endpoint application 190 to determine any segment name (e.g., a next expected segment) of the live event downloadable 120 are modified accordingly. For instance, in some embodiments, a sequence number increases by a value other than one from a given segment of the live event downloadable 120 to a next consecutive segment of the live event downloadable 120.

In some alternate embodiments, the parameterized segment name 128 can be replaced with any technically feasible method of specifying a sequence of segment names. For instance, in some embodiments, the parameterized segment name 128 is replaced with a sequence of disconnected values or unrelated strings that are shared among the media processing pipeline 104, the segment delivery application 130, the cloud-based media services 160, and the client device 180. In the same or other embodiments, the next sequence number 22 is replaced by a "next sequence name," and the techniques described herein are modified accordingly.

As depicted with the square numbered 5, the hold open engine 220 computes the next expected segment flag 224 based on the next sequence number 222 and the parameterized segment name 128 associated with the live event downloadable 120. The next expected segment flag 224 is a boolean that indicates whether the segment request 192(2) is a request for the next expected segment of the live event downloadable 120.

To compute the next expected segment flag 224, the hold open engine 220 computes a next segment name based on the next sequence number 222 and the parameterized segment name 128. The next segment name is the name of the next expected segment of the live event downloadable 120 and is therefore the name of the segment 122(2). Because the segment name specified in the segment request 192(2) matches the next segment name, the hold open engine 220 sets the next expected segment flag 224 to true.

As depicted with the square numbered 6, the hold open engine 220 adds the segment request 192(2) to the pending request list 230 at approximately 0 seconds, thereby designating the segment request 192(2) as a pending request. Because the segment request 192(2) is a pending request, the hold open engine 220 holds open the segment request 192(2) and the corresponding connection until the segment 122(2) is available.

If the pending request list 230 does not already include a request for the segment 122(2), then the hold open engine 220 begins to monitor the repository 140 in order to detect when the segment 122(2) has been stored in the repository 140 and, as a result, becomes available. If, however, the pending request list 230 already includes a request for the segment 122(2), then the hold open engine 220 continues to monitor the repository 140 in order to detect when the segment 122(2) has been stored in the repository 140.

After approximately 4 seconds, the media processing pipeline 104 generates and stores the segment 122(2) in the repository 140 (depicted via the square numbered 7). The hold open engine 220 detects that the segment 122(2) has been stored in the repository 140 at approximately 4 seconds and ceases to monitor the repository 140 for the segment 122(2). As depicted with the square numbered 8, the hold open engine 220 successfully accesses the segment 122(2) at approximately 4 seconds.

As depicted with the square numbered 9 and at approximately 4 seconds, the hold open engine 220 removes the segment request 192(2) from the pending request list 230. Although not shown, the hold open engine 220 also removes from the pending request list 230 any other pending segment requests for the segment 122(2).

As depicted with the square numbered 10, the hold open engine 220 transmits over the associated connection the segment response 194(2) that includes the segment 122(2) and corresponds to the segment request 192(2). Although not shown, for each of zero or more other pending segment requests for the segment 122(2), the hold open engine 220 transmits over the associated connection, a segment response that includes the segment 122(2) and corresponds to that pending segment request.

Figure 3:
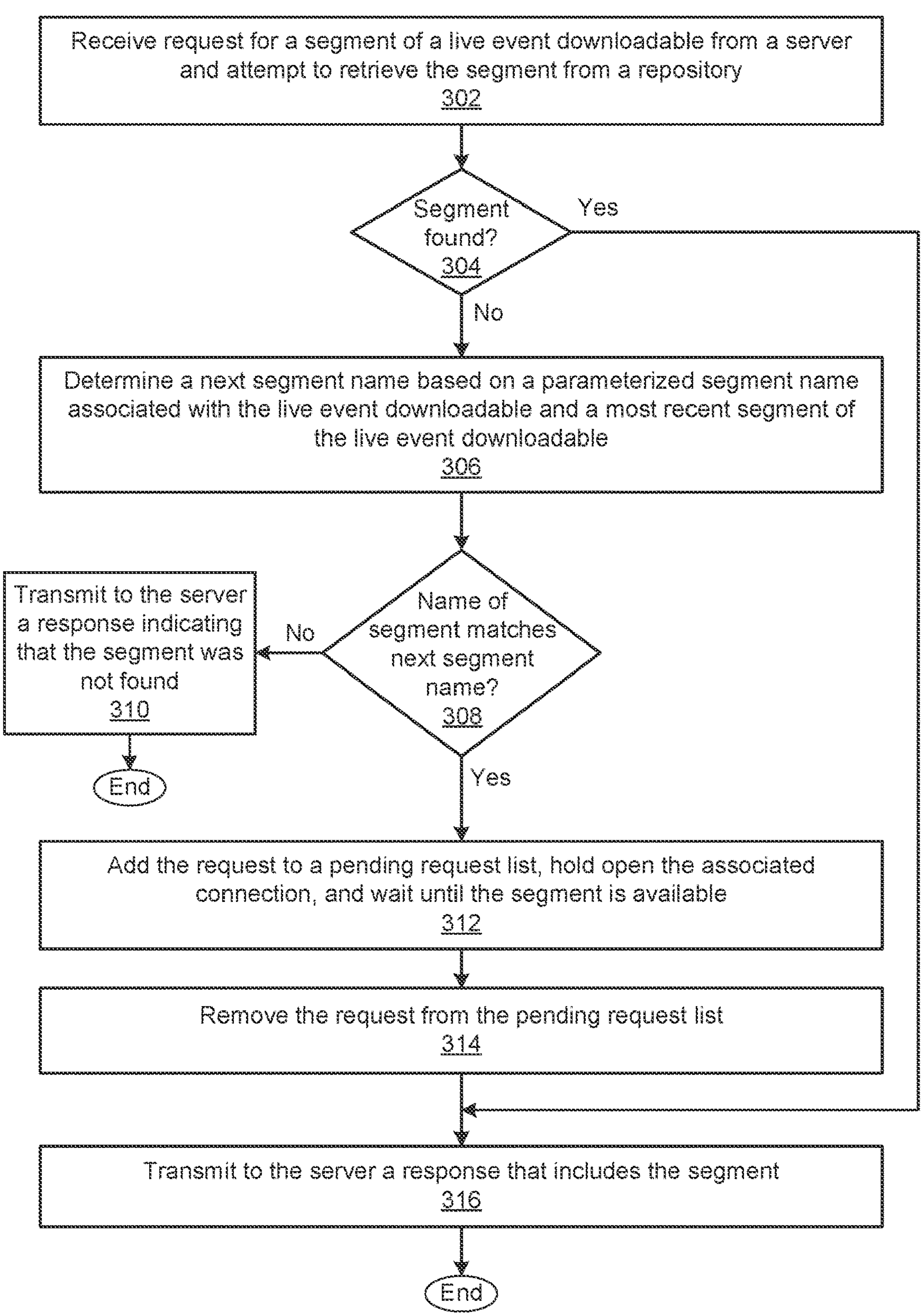
FIG. 3 is a flow diagram of method steps for transmitting a segment of a live event downloadable to a client device, according to various embodiments.

FIG. 3 is a flow diagram of method steps for transmitting a segment of a live event downloadable to a client device, according to various embodiments. Although the method steps are described with reference to the systems of FIGS. 1-2, persons skilled in the art will understand that any system configured to implement the method steps, in any order, falls within the scope of the embodiments.

As shown, a method 300 begins at step 302, where the segment delivery application 130 receives a request for a segment of a live event downloadable from a server and attempts to retrieve the segment from repository 140. At step 304, the segment delivery application 130 determines whether the segment was found in the repository 140. If, at step 304, the segment was found in the repository 140, then the method 300 proceeds directly to step 316. At step 316, the segment delivery application 130 transmits to the server a response that includes the segment. The method 300 then terminates.

If, however, at step 304, the segment was not found in the repository 140, then the method 300 proceeds to step 306. At step 306, the segment delivery application 130 determines a next segment name based on a parameterized segment name associated with the live event downloadable and a most recent segment of the live event downloadable.

At step 308, the segment delivery application 130 determines whether the name of the segment associated with the received request matches the next segment name. If, at step 308, the segment delivery application 130 determines that the name of the segment does not match the next segment name, then the method 300 proceeds to step 310. At step 310, the segment delivery application 130 transmits to the server a response indicating that the segment was not found. The method 300 then terminates.

If, however, at step 308, the segment delivery application 130 determines that the name of the segment matches the next segment name, then the method 300 proceeds directly to step 312. At step 312, the segment delivery application 130 adds the request to pending request list 230, holds open the associated connection, and waits until the segment is available.

At step 314, the segment delivery application 130 removes the request from the pending request list 230. At step 316, the segment delivery application 130 transmits to the server a response that includes the segment. The method 300 then terminates.

As persons skilled in the art will recognize, the method steps of FIG. 3 can be performed concurrently, sequentially, or any combination thereof to transmit any number of segments of any number of downloadables that are at least partially generated in an incremental fashion. Furthermore, one or more portions of one or more of the steps 306, 308, or 312 of FIG. 3 can be omitted for subsequent requests for a previously requested segment.

Figure 4:
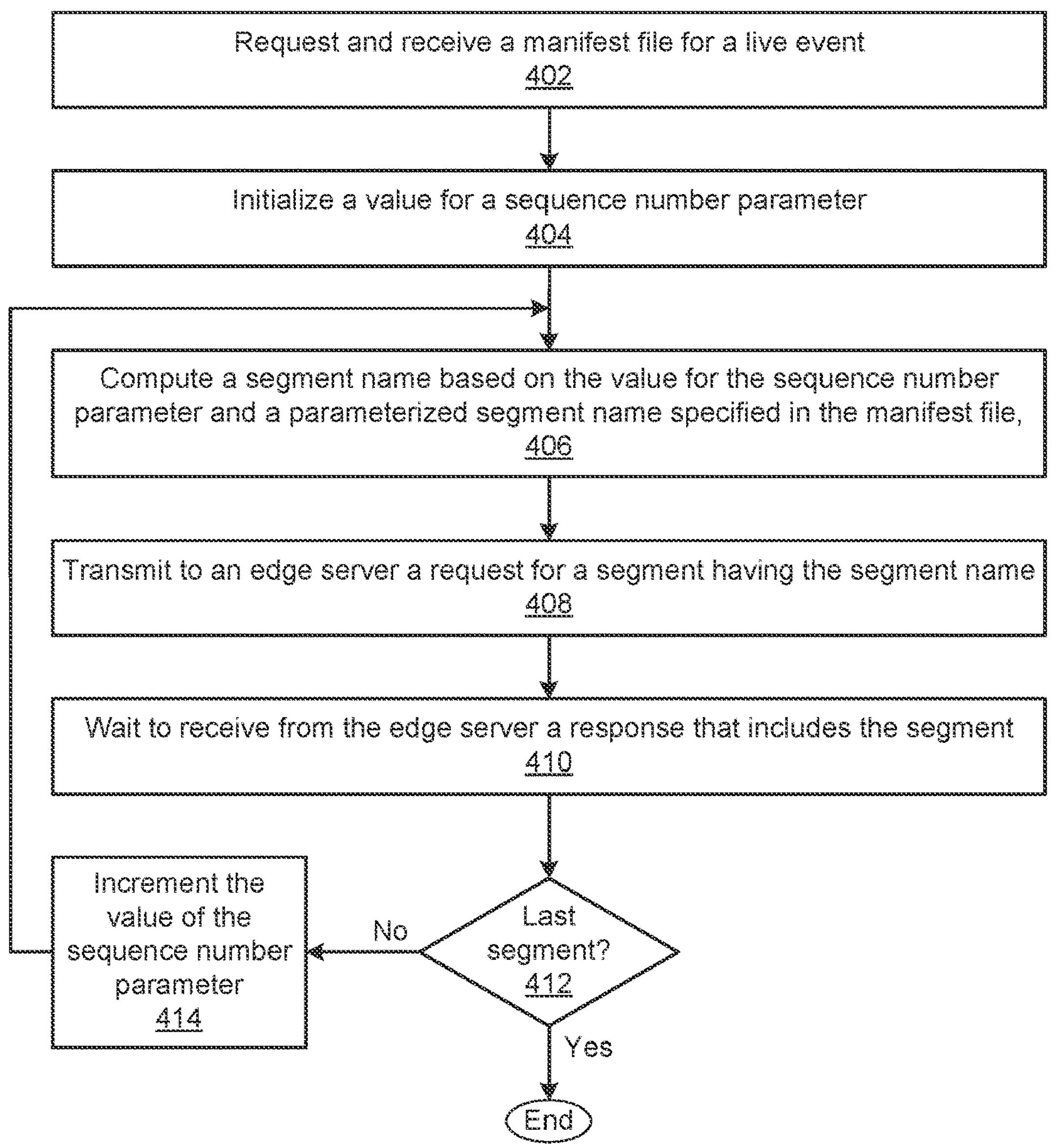
FIG. 4 is a flow diagram of method steps for streaming a live event downloadable, according to various embodiments.

Streaming a Live Event Downloadable via a Sequence of Preemptive Segment Requests FIG. 4 is a flow diagram of method steps for streaming a live event downloadable, according to various embodiments. Although the method steps are described with reference to the systems of FIGS. 1-2, persons skilled in the art will understand that any system configured to implement the method steps, in any order, falls within the scope of the embodiments.

As shown, a method 400 begins at step 402, where the endpoint application 190 requests and receives a manifest file for a live event. At step 404, the endpoint application 190 initializes a value for a sequence number parameter. At step 406, the endpoint application 190 computes a segment name based on the value for the sequence number parameter and a parameterized segment name specified in the manifest file.

At step 408, the endpoint application 190 transmits to an edge server a request for a segment having the segment name. At step 410, the endpoint application 190 waits to receive from the edge server a response that includes the segment. At step 412, the endpoint application 190 determines whether the segment is the last segment of the associated downloadable.

If, at step 412, the endpoint application 190 determines that the segment is not the last segment of the associated downloadable, then the method 400 proceeds to step 414. At step 414, the endpoint application 190 increments the value of the sequence number parameter. The method 400 then returns to step 406, where the endpoint application 190 computes a segment name based on the value for the sequence number parameter and a parameterized segment name specified in the manifest file.

If, however, at step 412, the endpoint application 190 determines that the segment is the last segment of the associated downloadable, then the method 400 terminates.

As persons skilled in the art will recognize, the method steps of FIG. 4 can be performed concurrently, sequentially, or any combination thereof to stream any number of downloadables that are at least partially generated in an incremental fashion. Furthermore, when executing the step 406, the endpoint application 190 can use different parameterized segment names corresponding to different downloadables in accordance with any number and/or types of adaptive streaming techniques.

In sum, the disclosed techniques can be used to selectively hold open premature requests for the next expected segments of live event downloadables until the next expected segments are available. In some embodiments, prior to a live event, a media processing pipeline defines a different parameterized segment name for each downloadable that is to be generated based on live media feed(s) associated with the live event. Each parameterized segment name includes a sequence number parameter for the downloadable, where the value of the sequence number parameter indicates the relative order of a corresponding segment within the downloadable. The media processing pipeline transmits the parameterized segment names to an origin server and to cloud-based media services. During the live event, the media processing pipeline generates segments of downloadables based on discrete portions of the associated live media feed(s), where the media processing pipeline names the segments in accordance with the corresponding parameterized segment names. As the media processing pipeline generates segments, the media processing pipeline stores the segments in a repository associated with the origin server.

A segment delivery application executing on a processor included in the origin server responds to requests for segments received from servers in a CDN. Upon receiving a request from a server in the CDN for a segment that is stored in the repository, the segment delivery application transmits to the server a response that includes the segment. Upon receiving a request from a server for a segment of a downloadable that is not stored in the repository the segment delivery application determines whether the segment is the next expected segment of the downloadable. More specifically, the segment delivery application identifies a sequence number of the most recent segment of the downloadable that is stored in the repository and increments the sequence number to generate a next sequence number. The segment delivery application then computes the name of the next expected segment based on the parameterized segment name associated with the downloadable and the next sequence number. If the name of the next expected segment does not match the name of the segment specified in the request, then the segment delivery application determines that the segment is not the next expected segment of the downloadable and transmits a response to the server that indicates the segment was not found.

If, however, the name of the next expected segment matches the name of the segment specified in the request, then the segment delivery application determines that the segment is the next expected segment of the downloadable. The segment delivery application adds the request to a list of pending requests and leaves the associated connection to the server open. Subsequently, upon detecting that the media processing pipeline has written the segment to the repository, the segment delivery application removes the request from the pending list and transmits a response to the server that includes the segment.

Prior to streaming the live event, a client device requests and receives, from the cloud-based media servers, a manifest file for the live event. The manifest file describes downloadables that are generated in real-time during the live event and includes the associated parameterized segment names. To stream the live event, for each of one or more downloadables, the client device generates a request for the first segment of the downloadable based on the associated parameterized segment name and transmits the request to an edge server included in a CDN. Repeatedly during the live event, upon receiving from the edge server a response that includes a requested segment of a downloadable, the client device preemptively generates a new request for the next expected segment of the downloadable based on the associated parameterized segment name and transmits the request to the edge server.

At least one technical advantage of the disclosed techniques relative to the prior art is that, with the disclosed techniques, an origin server can delay responding to a premature request for a segment of a downloadable until that segment is actually available. In that regard, the disclosed techniques enable the origin server to determine whether a requested segment is the next expected segment of a downloadable based on a parameterized segment name for the downloadable and the most recent segment stored in a memory associated with the origin server. Notably, with the disclosed techniques, a client device can preemptively transmit a request to an edge server for a segment of a downloadable and, after the segment becomes available to the origin server, receive from the edge server a response that includes the segment. Because the disclosed techniques enable a client device to receive a segment of a downloadable that is prematurely requested without having to re-request the segment, the amount of network and processing resources used to stream live events can be reduced relative to what is required using prior art techniques. These technical advantages provide one or more technological advancements over prior art approaches.

1. In some embodiments, a computer-implemented method for streaming segments of downloadables to client devices comprises, at a first point-in-time, receiving a first request from a first server for a first segment of a first downloadable; determining that the first segment is not available; determining that the first segment comprises a next expected segment of the first downloadable; at a second point-in-time, determining that the first segment has become available; and upon determining that the first segment has become available, transmitting to the first server a first response that includes the first segment and corresponds to the first request.

2. The computer-implemented method of clause 1, wherein the first server is included in a content delivery network.

3. The computer-implemented method of clauses 1 or 2, wherein determining that the first segment comprises the next expected segment of the first downloadable comprises computing a name of the next expected segment based on a parameterized segment name associated with the first downloadable.

4. The computer-implemented method of any of clauses 1-3, wherein determining that the first segment has become available comprises detecting that at least a portion of the first segment has been received by an origin server.

5. The computer-implemented method of any of clauses 1-4, further comprising, in response to determining that the first segment comprises the next expected segment, adding the first request to a list of pending requests, wherein one or more of the pending requests are serviced once the first segment becomes available.

6. The computer-implemented method of any of clauses 1-5, further comprising, removing the first request from a list of pending requests once the first segment becomes available.

7. The computer-implemented method of any of clauses 1-6, further comprising at a third point-in-time, receiving a second request from a second server for the first segment, wherein the third point-in-time precedes the second point-in-time; and upon determining that the first segment has become available, transmitting to the second server a second response that includes the first segment and corresponds to the second request.

8. The computer-implemented method of any of clauses 1-7, further comprising, at a third point-in-time receiving a second request from a second server for the first segment, wherein the third point-in-time is subsequent to the second point-in-time; and in response to the second request, transmitting to the second server a second response that includes the first segment.

9. The computer-implemented method of any of clauses 1-8, wherein determining that the first segment is not available comprises attempting to access the first segment from a memory associated with an origin server.

10. The computer-implemented method of any of clauses 1-9, wherein the first downloadable is associated with a live event.

11. In some embodiments, one or more non-transitory computer readable media include instructions that, when executed by one or more processors, cause the one or more processors to stream segments of downloadables to client devices by performing the steps of, at a first point-in-time, receiving a first request from a first server for a first segment of a first downloadable; determining that the first segment is not available; determining that the first segment comprises a next expected segment of the first downloadable; at a second point-in-time, determining that the first segment has become available; and upon determining that the first segment has become available, transmitting to the first server a first response that includes the first segment and corresponds to the first request.

12. The one or more non-transitory computer readable media of clause 11, wherein the first request is transmitted by a client device and relayed through at least a portion a content delivery network to the first server.

13. The one or more non-transitory computer readable media of clauses 11 or 12, wherein determining that the first segment comprises the next expected segment of the first downloadable comprises computing a name of the next expected segment based on a sequence number associated with a most recent segment of the first downloadable that is stored in a memory associated with an origin server.

14. The one or more non-transitory computer readable media of any of clauses 11-13, wherein determining that the first segment has become available comprises detecting that at least a portion of the first segment has been stored in a memory associated with an origin server.

15. The one or more non-transitory computer readable media of any of clauses 11-14, further comprising, in response to determining that the first segment comprises the next expected segment, adding the first request to a list of pending requests, wherein one or more of the pending requests are serviced once the first segment becomes available.

16. The one or more non-transitory computer readable media of any of clauses 11-15, further comprising, removing the first request from a list of pending requests once the first segment becomes available.

17. The one or more non-transitory computer readable media of any of clauses 11-16, further comprising, at a third point-in-time, receiving a second request from a second server for the first segment, wherein the third point-in-time precedes the second point-in-time; and upon determining that the first segment has become available, transmitting to the second server a second response that includes the first segment and corresponds to the second request.

18. The one or more non-transitory computer readable media of any of clauses 11-17, further comprising, at a third point-in-time receiving a second request from a second server for the first segment, wherein the third point-in-time is subsequent to the second point-in-time; and in response to the second request, transmitting to the second server a second response that includes the first segment.

19. The one or more non-transitory computer readable media of any of clauses 11-18, wherein a portion of a live video feed, a live audio feed, or a live subtitle feed is encoded to generate the first segment.

20. In some embodiments, a system comprises one or more memories storing instructions and one or more processors coupled to the one or more memories that, when executing the instructions, perform the steps of at a first point-in-time, receiving a first request from a first server for a first segment of a first downloadable; determining that the first segment is not available; determining that the first segment comprises a next expected segment of the first downloadable; at a second point-in-time, determining that the first segment has become available; and upon determining that the first segment has become available, transmitting to the first server a first response that includes the first segment and corresponds to the first request.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory, Flash memory, an optical fiber, a portable compact disc read-only memory, an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for streaming segments of downloadables to client devices, the method comprising:

at a first point-in-time, receiving a first request from a first server for a first segment of a first downloadable;

determining that the first segment is not available;

determining that the first segment is a next expected segment of the first downloadable;

at a second point-in-time, determining that the first segment has become available by detecting that a beginning portion of the first segment has become available without detecting that the entire first segment has become available; and upon determining that the first segment has become available, transmitting to the first server a first response that includes at least the beginning portion of the first segment and corresponds to the first request.

2. The computer-implemented method of claim 1, wherein the first server is included in a content delivery network.

3. The computer-implemented method of claim 1, wherein determining that the first segment comprises the next expected segment of the first downloadable comprises computing a name of the next expected segment based on a parameterized segment name associated with the first downloadable.

4. The computer-implemented method of claim 1, wherein determining that the first segment has become available comprises detecting that at least a portion of the first segment has been received by an origin server.

5. The computer-implemented method of claim 1, further comprising, in response to determining that the first segment comprises the next expected segment, adding the first request to a list of pending requests, wherein one or more of the pending requests are serviced once the first segment becomes available.

6. The computer-implemented method of claim 1, further comprising, removing the first request from a list of pending requests once the first segment becomes available.

7. The computer-implemented method of claim 1, further comprising:

at a third point-in-time, receiving a second request from a second server for the first segment, wherein the third point-in-time precedes the second point-in-time; and upon determining that the first segment has become available, transmitting to the second server a second response that includes the first segment and corresponds to the second request.

8. The computer-implemented method of claim 1, further comprising:

at a third point-in-time receiving a second request from a second server for the first segment, wherein the third point-in-time is subsequent to the second point-in-time; and in response to the second request, transmitting to the second server a second response that includes the first segment.

9. The computer-implemented method of claim 1, wherein determining that the first segment is not available comprises attempting to access the first segment from a memory associated with an origin server.

10. The computer-implemented method of claim 1, wherein the first downloadable is associated with a live event.

11. One or more non-transitory computer readable media including instructions that, when executed by one or more processors, cause the one or more processors to stream segments of downloadables to client devices by performing the steps of:

at a first point-in-time, receiving a first request from a first server for a first segment of a first downloadable;

determining that the first segment is not available;

determining that the first segment is a next expected segment of the first downloadable;

at a second point-in-time, determining that the first segment has become available by detecting that a beginning portion of the first segment has become available without detecting that the entire first segment has become available; and upon determining that the first segment has become available, transmitting to the first server a first response that includes at least the beginning portion of the first segment and corresponds to the first request.

12. The one or more non-transitory computer readable media of claim 11, wherein the first request is transmitted by a client device and relayed through at least a portion a content delivery network to the first server.

13. The one or more non-transitory computer readable media of claim 11, wherein determining that the first segment comprises the next expected segment of the first downloadable comprises computing a name of the next expected segment based on a sequence number associated with a most recent segment of the first downloadable that is stored in a memory associated with an origin server.

14. The one or more non-transitory computer readable media of claim 11, wherein determining that the first segment has become available comprises detecting that at least a portion of the first segment has been stored in a memory associated with an origin server.

15. The one or more non-transitory computer readable media of claim 11, further comprising, in response to determining that the first segment comprises the next expected segment, adding the first request to a list of pending requests, wherein one or more of the pending requests are serviced once the first segment becomes available.

16. The one or more non-transitory computer readable media of claim 11, further comprising, removing the first request from a list of pending requests once the first segment becomes available.

17. The one or more non-transitory computer readable media of claim 11, further comprising:

at a third point-in-time, receiving a second request from a second server for the first segment, wherein the third point-in-time precedes the second point-in-time; and upon determining that the first segment has become available, transmitting to the second server a second response that includes the first segment and corresponds to the second request.

18. The one or more non-transitory computer readable media of claim 11, further comprising:

at a third point-in-time receiving a second request from a second server for the first segment, wherein the third point-in-time is subsequent to the second point-in-time; and in response to the second request, transmitting to the second server a second response that includes the first segment.

19. The one or more non-transitory computer readable media of claim 11, wherein a portion of a live video feed, a live audio feed, or a live subtitle feed is encoded to generate the first segment.

20. A system comprising:

one or more memories storing instructions; and one or more processors coupled to the one or more memories that, when executing the instructions, perform the steps of:

at a first point-in-time, receiving a first request from a first server for a first segment of a first downloadable;

determining that the first segment is not available;

determining that the first segment is a next expected segment of the first downloadable;

at a second point-in-time, determining that the first segment has become available by detecting that a beginning portion of the first segment has become available without detecting that the entire first segment has become available; and upon determining that the first segment has become available, transmitting to the first server a first response that includes at least the beginning portion of the first segment and corresponds to the first request.

21. The computer-implemented method of claim 1, wherein determining that the first segment has become available comprises detecting that the beginning portion of the first segment has been received at an origin server or has been stored to the origin server.

22. The computer-implemented method of claim 1, wherein a second segment is prior in sequence to the first segment in the first downloadable, the first segment having a first duration that is different than a second duration of the second segment.

* * * * *